(12) United States Patent
Maliszewski et al.

(10) Patent No.: US 9,096,000 B2
(45) Date of Patent: Aug. 4, 2015

(54) THERMOPLASTIC PREPREG CONTAINING CONTINUOUS AND LONG FIBERS

(75) Inventors: Jeremy J. Maliszewski, Galesville, WI (US); Aaron H. Johnson, Winona, MN (US); Timothy L. Tibor, Winona, MN (US)

(73) Assignee: Ticona LLC, Florence, KY (US)

(*) Notice: Subject to any disclaimer, the term of this patent is extended or adjusted under 35 U.S.C. 154(b) by 16 days.

(21) Appl. No.: 13/698,382

(22) PCT Filed: Jun. 22, 2011

(86) PCT No.: PCT/US2011/041454
§ 371 (c)(1),
(2), (4) Date: Feb. 12, 2013

(87) PCT Pub. No.: WO2011/163365
PCT Pub. Date: Dec. 29, 2011

(65) Prior Publication Data
US 2013/0136890 A1    May 30, 2013

Related U.S. Application Data

(60) Provisional application No. 61/357,301, filed on Jun. 22, 2010.

(51) Int. Cl.
*B29C 47/02* (2006.01)
*B29C 47/30* (2006.01)
(Continued)

(52) U.S. Cl.
CPC ............. *B29C 47/028* (2013.01); *B29B 15/122* (2013.01); *B29C 47/004* (2013.01);
(Continued)

(58) Field of Classification Search
CPC .... B29C 70/081; B29C 47/028; B29C 70/08; B29B 11/16; B29B 15/122; B29K 2995/0077; B32B 2307/54

USPC .................. 428/113, 299.1, 298.1
See application file for complete search history.

(56) References Cited

U.S. PATENT DOCUMENTS

| | | |
|---|---|---|
| 3,669,158 A | 6/1972 | Phillips |
| 4,394,338 A | 7/1983 | Fuwa |

(Continued)

FOREIGN PATENT DOCUMENTS

| | | |
|---|---|---|
| DE | 102007018052 | 10/2008 |
| EP | 0155552 | 9/1985 |

(Continued)

*Primary Examiner* — Aaron Austin
*Assistant Examiner* — Jasper Saberi
(74) *Attorney, Agent, or Firm* — Dority & Manning, P.A.

(57) ABSTRACT

A prepreg that contains a plurality of unidirectionally aligned continuous fibers embedded within a thermoplastic polymer matrix is provided. In addition to continuous fibers, the prepreg also contains a plurality of long fibers that are combined with the continuous fibers so that they are randomly distributed within the thermoplastic matrix. As a result, at least a portion of the long fibers become oriented at an angle (e.g., perpendicular) relative to the direction of the continuous fibers. Through such orientation, the long fibers can substantially increase the mechanical properties of the prepreg in the transverse direction (e.g., strength) and thus achieve a more isotropic material. Although unique isotropic prepregs are one aspect of the present invention, it should be understood that this is not a requirement. In fact, one notable feature of the present invention is the ability to tailor the mechanical properties of the prepreg for an intended application by selectively controlling certain process parameters, such as the type of long fibers employed, the type of continuous fibers employed, the concentration of the long fibers, the concentration of the continuous fibers, the thermoplastic resin(s) employed, etc.

21 Claims, 9 Drawing Sheets

(51) Int. Cl.
*B29C 47/70* (2006.01)
*B29C 70/08* (2006.01)
*B29C 70/52* (2006.01)
*B32B 5/12* (2006.01)
*B29C 47/38* (2006.01)
*B29C 47/06* (2006.01)
*B29C 47/88* (2006.01)
*B29B 15/12* (2006.01)
*B29C 47/00* (2006.01)
*B29K 105/08* (2006.01)

(52) U.S. Cl.
CPC .......... *B29C47/0057* (2013.01); *B29C 47/025* (2013.01); *B29C 47/027* (2013.01); *B29C 47/065* (2013.01); *B29C 47/30* (2013.01); *B29C 47/385* (2013.01); *B29C 47/70* (2013.01); *B29C 47/707* (2013.01); *B29C 47/8895* (2013.01); *B29C 70/08* (2013.01); *B29C 70/081* (2013.01); *B29C 70/523* (2013.01); *B32B 5/12* (2013.01); *B29C 47/0019* (2013.01); *B29C 47/0021* (2013.01); *B29K 2105/08* (2013.01); *B29K 2105/0872* (2013.01); *Y10T 428/24124* (2015.01)

(56) References Cited

U.S. PATENT DOCUMENTS

| | | |
|---|---|---|
| 4,541,884 A | 9/1985 | Cogswell et al. |
| 4,549,920 A | 10/1985 | Cogswell et al. |
| 4,564,540 A | 1/1986 | Davies et al. |
| 4,588,538 A | 5/1986 | Chung et al. |
| 4,640,065 A | 2/1987 | Harris et al. |
| 4,681,722 A | 7/1987 | Carter et al. |
| 4,749,613 A | 6/1988 | Yamada et al. |
| 4,752,313 A | 6/1988 | Allaire et al. |
| 4,752,513 A | 6/1988 | Rau et al. |
| RE32,772 E | 10/1988 | Hawley |
| 4,792,481 A | 12/1988 | O'Connor et al. |
| 4,874,563 A | 10/1989 | McMahon et al. |
| 4,883,552 A | 11/1989 | O'Connor et al. |
| 4,924,631 A | 5/1990 | Davies et al. |
| 4,938,823 A | 7/1990 | Balazek et al. |
| 4,984,402 A | 1/1991 | Davies |
| 4,992,229 A | 2/1991 | Beever |
| 5,026,410 A | 6/1991 | Pollet et al. |
| 5,026,447 A | 6/1991 | O'Connor |
| 5,091,036 A | 2/1992 | Taylor |
| 5,095,632 A | 3/1992 | Hassler, Jr. et al. |
| 5,098,496 A | 3/1992 | Breitigam et al. |
| 5,114,516 A | 5/1992 | Pilling et al. |
| 5,120,380 A | 6/1992 | Strachan |
| 5,122,417 A | 6/1992 | Murakami et al. |
| 5,128,198 A | 7/1992 | Dyksterhouse et al. |
| 5,174,844 A | 12/1992 | Tong |
| 5,198,172 A | 3/1993 | Spoo et al. |
| 5,225,020 A | 7/1993 | Millett et al. |
| 5,225,140 A | 7/1993 | Hayashikoshi et al. |
| 5,294,461 A | 3/1994 | Ishida |
| 5,324,377 A | 6/1994 | Davies |
| 5,336,526 A | 8/1994 | Spoo et al. |
| 5,401,154 A | 3/1995 | Sargent |
| 5,492,583 A | 2/1996 | Fingerson et al. |
| 5,492,743 A | 2/1996 | Schroll et al. |
| 5,503,928 A | 4/1996 | Cheshire |
| 5,520,867 A | 5/1996 | Shirai et al. |
| 5,534,210 A | 7/1996 | Shirai et al. |
| 5,540,986 A | 7/1996 | Kimura et al. |
| 5,552,215 A | 9/1996 | Tredway et al. |
| 5,556,496 A | 9/1996 | Sumerak |
| 5,585,155 A | 12/1996 | Heikkila et al. |
| 5,700,417 A | 12/1997 | Fernyhough et al. |
| 5,716,479 A | 2/1998 | Mikats et al. |
| 5,716,487 A | 2/1998 | Sumerak |
| 5,727,357 A | 3/1998 | Arumugasaamy et al. |
| 5,747,075 A | 5/1998 | Gauchel et al. |
| 5,779,961 A | 7/1998 | Teutsch |
| 5,783,013 A | 7/1998 | Beckman et al. |
| 5,792,529 A | 8/1998 | May |
| 5,830,304 A | 11/1998 | Priesnitz et al. |
| 5,882,564 A | 3/1999 | Puppin |
| 5,902,755 A | 5/1999 | Driggett et al. |
| 5,911,932 A | 6/1999 | Dyksterhouse |
| 5,935,508 A | 8/1999 | Fernyhough et al. |
| 6,007,656 A | 12/1999 | Heikkila et al. |
| 6,037,056 A | 3/2000 | Macdonald et al. |
| 6,045,876 A | 4/2000 | Fellers et al. |
| 6,048,427 A | 4/2000 | Gauchel et al. |
| 6,090,319 A | 7/2000 | Sharma et al. |
| 6,106,944 A | 8/2000 | Heikkila et al. |
| 6,122,877 A | 9/2000 | Hendrickson et al. |
| 6,185,962 B1 | 2/2001 | Hartman et al. |
| 6,260,251 B1 | 7/2001 | Guhl |
| 6,346,325 B1 | 2/2002 | Edwards et al. |
| 6,387,179 B1 | 5/2002 | Anderson et al. |
| 6,524,690 B1 | 2/2003 | Dyksterhouse |
| 6,656,316 B1 | 12/2003 | Dyksterhouse |
| 6,709,995 B1 | 3/2004 | Dyksterhouse |
| 6,746,747 B2 | 6/2004 | Davies et al. |
| 6,763,869 B2 | 7/2004 | Sakai et al. |
| 6,794,032 B2 | 9/2004 | Borgner et al. |
| 6,808,796 B1 | 10/2004 | Miyao et al. |
| 6,821,613 B1 | 11/2004 | Kagi et al. |
| 6,846,857 B1 | 1/2005 | Lindner |
| 6,854,791 B1 | 2/2005 | Jaggi |
| 6,872,273 B2 | 3/2005 | Davies et al. |
| 6,872,343 B2 | 3/2005 | Edwards et al. |
| 6,881,288 B2 | 4/2005 | Davies et al. |
| 6,955,735 B2 | 10/2005 | Kusek |
| 7,249,943 B2 | 7/2007 | Benson et al. |
| 7,276,132 B2 | 10/2007 | Davies et al. |
| 7,297,740 B2 * | 11/2007 | Dyksterhouse ............... 524/494 |
| 7,387,147 B2 | 6/2008 | Johnson et al. |
| 7,402,268 B2 | 7/2008 | Boissonnat et al. |
| 7,413,623 B2 | 8/2008 | Raday |
| 7,470,388 B2 | 12/2008 | Hüsler et al. |
| 2001/0047844 A1 | 12/2001 | Edwards et al. |
| 2002/0061374 A1 | 5/2002 | O'Brien et al. |
| 2002/0110680 A1 | 8/2002 | Bank et al. |
| 2002/0123287 A1 * | 9/2002 | Davies et al. ................. 442/327 |
| 2002/0123288 A1 | 9/2002 | Davies et al. |
| 2003/0003265 A1 | 1/2003 | Davies et al. |
| 2004/0009338 A1 * | 1/2004 | Jo et al. ...................... 428/297.4 |
| 2005/0008804 A1 | 1/2005 | Davies et al. |
| 2006/0165955 A1 | 7/2006 | Ruegg et al. |
| 2006/0280938 A1 | 12/2006 | Atkinson |
| 2007/0113958 A1 | 5/2007 | Brown et al. |
| 2007/0113983 A1 | 5/2007 | Brown et al. |
| 2007/0116941 A1 | 5/2007 | Brown et al. |
| 2007/0125301 A1 | 6/2007 | Zhou et al. |
| 2007/0126142 A1 | 6/2007 | Zhou et al. |
| 2007/0183843 A1 | 8/2007 | Spaans et al. |
| 2007/0243368 A1 * | 10/2007 | Edwards ..................... 428/292.1 |
| 2008/0053596 A1 | 3/2008 | Davies et al. |
| 2008/0300355 A1 | 12/2008 | Kenny et al. |
| 2009/0011210 A1 | 1/2009 | Gao et al. |
| 2009/0023870 A1 | 1/2009 | Berksoy et al. |
| 2009/0071593 A1 | 3/2009 | Slaback et al. |
| 2009/0104418 A1 | 4/2009 | Ohki et al. |
| 2009/0123693 A1 | 5/2009 | Paul |
| 2009/0206515 A1 | 8/2009 | Jansen et al. |
| 2009/0324923 A1 | 12/2009 | Gleich et al. |
| 2010/0108812 A1 | 5/2010 | Boursier et al. |
| 2011/0049750 A1 | 3/2011 | Bechtold |
| 2011/0143110 A1 * | 6/2011 | Tsuchiya et al. .............. 428/213 |

FOREIGN PATENT DOCUMENTS

| | | |
|---|---|---|
| EP | 0281447 | 9/1988 |
| EP | 0444867 | 9/1991 |
| FR | 2266595 | 10/1975 |
| GB | 1302049 | 1/1973 |
| GB | 2041489 | 9/1980 |

(56) References Cited

FOREIGN PATENT DOCUMENTS

| | | |
|---|---|---|
| GB | 2262470 | 6/1993 |
| GB | 2448363 | 10/2008 |
| JP | H02/276625 A | 11/1990 |
| JP | H04-223105 A | 8/1992 |
| JP | H07-62246 A | 3/1995 |
| JP | H09-155862 | 6/1997 |
| JP | H11-10643 A | 1/1999 |
| JP | 2001-145958 A | 5/2001 |
| WO | 92/03277 | 3/1992 |
| WO | 00/78529 | 12/2000 |
| WO | 2004/080698 | 9/2004 |
| WO | 2006/044315 | 4/2006 |
| WO | WO 2006/044315 | 4/2006 |
| WO | WO 2009/142291 | 11/2009 |

\* cited by examiner ions_, filed on Jun. 22, 2010, the

THERMOPLASTIC PREPREG CONTAINING CONTINUOUS AND LONG FIBERS

RELATED APPLICATIONS

The present application claims priority to Provisional Application Ser. No. 61/357,301, filed on Jun. 22, 2010, the entire contents of which are incorporated herein by reference thereto.

BACKGROUND OF THE INVENTION

Reinforced composite materials (or "prepregs") have conventionally been formed from fibers (e.g., carbon or glass fibers) that are impregnated within a resinous matrix. Thermoset resins (e.g., unsaturated polyester, epoxy, or polyimide) are often employed as the matrix, particularly in applications requiring a high level of strength. One problem with prepregs formed from thermoset resins, however, is that they are generally brittle and have poor impact resistance. Furthermore, the prepregs are often difficult to store due to the short shelf life of the resin. In an attempt to overcome these issues, efforts have recently been made develop thermoplastic prepregs. One such prepreg is formed from a thermoplastic resin and unidirectionally aligned continuous fibers. Such a prepreg has excellent performance in terms of modulus of elasticity and strength in the fiber axis direction. However, because such prepregs have anisotropic mechanical properties, multiple prepreg layers are required during use that are oriented in different direction(s). This inevitably causes an increase in the cost and thickness of the resulting part. Other attempts to solve the problem associated with thermoset prepregs involve the use of a thermoplastic resin and chopped fibers formed by cutting unidirectionally aligned strands. While such prepregs exhibit better isotropic strength properties, the maximum volume fraction of the reinforcing fiber is generally low, which results in relatively poor modulus of elasticity and strength. Furthermore, it is difficult to tailor the mechanical properties of the prepreg through manipulation of the volume of such chopped fibers.

As such, a need currently exists for a method of forming thermoplastic prepregs that allows for selective control of its mechanical properties depending on the particular application. A need also exists for thermoplastic prepregs that have isotropic mechanical properties.

SUMMARY OF THE INVENTION

In accordance with one embodiment of the present invention, a thermoplastic prepreg is disclosed that comprises a plurality of continuous fibers that are substantially oriented in a longitudinal direction and a plurality of randomly distributed long fibers, at least a portion of which are oriented at an angle relative to the longitudinal direction. The continuous fibers constitute from about 10 wt. % to about 80 wt. % of the prepreg and the long fibers constitute from about 2 wt. % to about 35 wt. % of the prepreg. The prepreg also comprises a resinous matrix that contains one or more thermoplastic polymers and within which the continuous fibers and long fibers are embedded, wherein the thermoplastic polymers constitute from about 10 wt. % to about 80 wt. % of the prepreg. The ratio of the maximum tensile stress of the prepreg in the longitudinal direction to the maximum tensile stress of the prepreg in the transverse direction is from about 1 to about 40.

In accordance with another embodiment of the present invention, a method for forming a thermoplastic prepreg is disclosed. The method comprises supplying continuous fibers and long fibers to an extrusion device and supplying a thermoplastic feedstock to the extrusion device, wherein the feedstock comprises at least one thermoplastic polymer. The continuous fibers, long fibers, and the thermoplastic polymer are extruded within an impregnation die to form an extrudate in which the continuous fibers are intermixed with the long fibers and embedded with a matrix of the thermoplastic polymer.

In accordance with yet another embodiment of the present invention, a method for forming a thermoplastic prepreg is disclosed. The method comprises supplying continuous fibers and a thermoplastic feedstock to the extrusion device, wherein the feedstock comprises at least one thermoplastic polymer. The continuous fibers and feedstock are extruded within an impregnation die to form an extrudate that in which the continuous fibers are embedded with a matrix of the thermoplastic polymer. Thereafter, long fibers are applied to the extrudate to form a composite.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
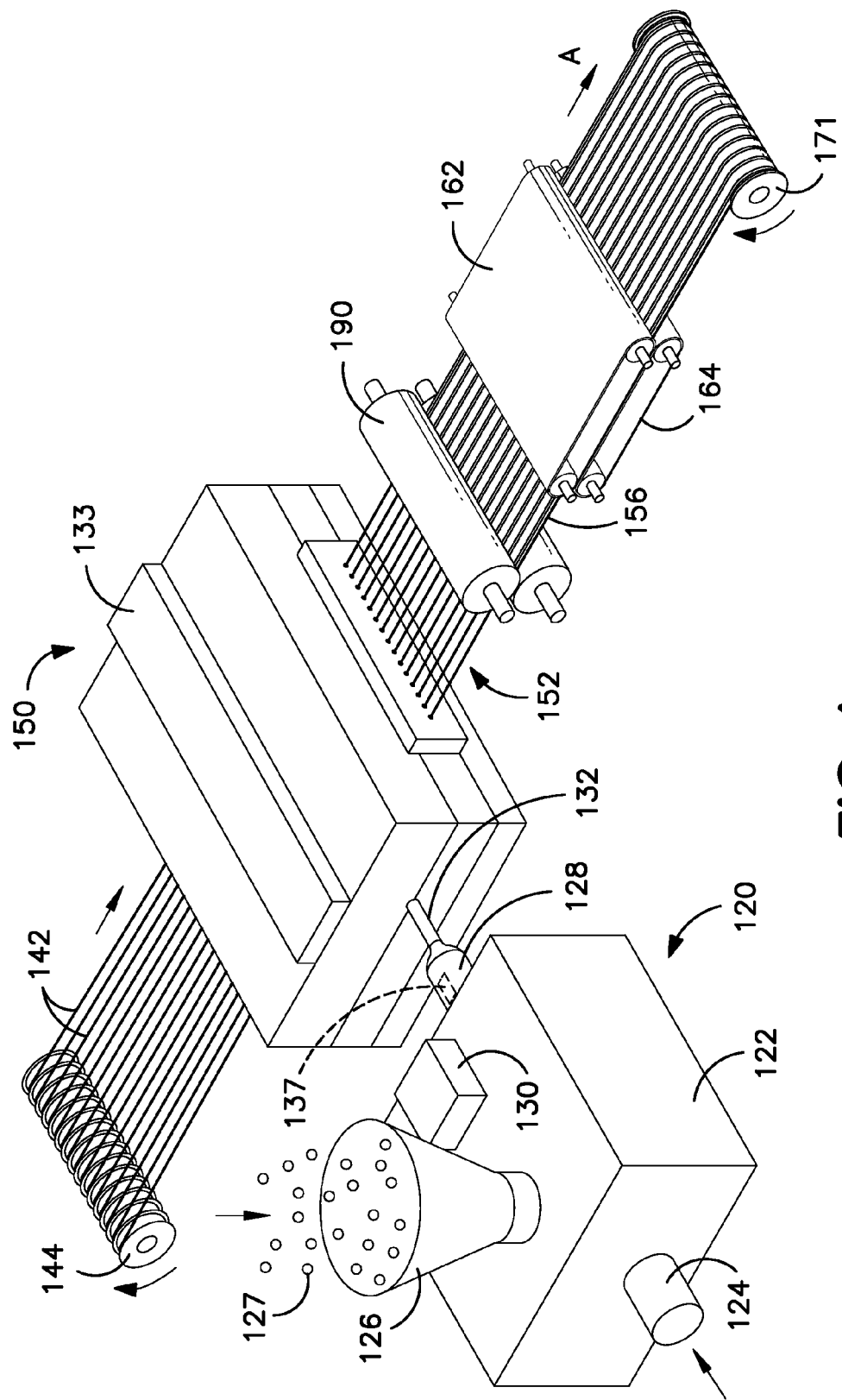
FIG. 1 is a schematic illustration of one embodiment of an impregnation system for use in the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a prepreg that contains a plurality of unidirectionally aligned continuous fibers embedded within a thermoplastic polymer matrix. In addition to continuous fibers, the prepreg also contains a plurality of long fibers that are combined with the continuous fibers so that they are randomly distributed within the thermoplastic matrix. As a result, at least a portion of the long fibers become oriented at an angle (e.g., perpendicular) relative to the direction of the continuous fibers. Through such orientation, the long fibers can substantially increase the mechanical properties of the prepreg in the transverse direction (e.g., strength) and thus achieve a more isotropic material. Although unique isotropic prepregs are one aspect of the present invention, it should be understood that this is not a requirement. In fact, one notable feature of the present invention is the ability to tailor the mechanical properties of the prepreg for an intended application by selectively controlling certain process parameters, such as the type of long fibers employed, the type of continuous fibers employed, the concentration of the long fibers, the concentration of the continuous fibers, the thermoplastic resin(s) employed, etc.

Various embodiments of the present invention will now be described in more detail.

I. Continuous Fibers

The term "continuous fibers" refers to fibers, filaments, yarns, or rovings (e.g., bundles of fibers) having a length that is generally limited only by the length of the part. For example, such fibers may have a length greater than about 25 millimeters, in some embodiments about 50 millimeters or more, and in some embodiments, about 100 millimeters or more. The continuous fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable for use in the continuous fibers. Such fibers often have a nominal diameter of about 4 to about 35 micrometers, and in some embodiments, from about 9 to about 35 micrometers. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain continuous carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

II. Long Fibers

The term "long fibers" generally refers to fibers, filaments, yarns, or rovings that are not continuous and have a length of from about 0.5 to about 25 millimeters, in some embodiments, from about 0.8 to about 15 millimeters, and in some embodiments, from about 1 to about 12 millimeters. The long fibers may be formed from any of the material, shape, and/or size as described above with respect to the continuous fibers. Glass fibers and carbon fibers are particularly desirable for use as the long fibers.

III. Thermoplastic Matrix

Any of a variety of thermoplastic polymers may be employed to form the thermoplastic matrix in which the continuous and long fibers are embedded. Suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS")), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. ABS is a particularly suitable thermoplastic polymer.

One or multiple thermoplastic matrices may be employed in the prepreg. For example, in one embodiment, the long fibers are initially pre-impregnated with a first thermoplastic matrix, such as in a manner that will be described below, and thereafter cooled and chopped into to pellets having a length of about 25 millimeters or less. These pellets may be subsequently combined with the continuous fibers as they are impregnated with a second thermoplastic matrix. Thus, in this embodiment, the long fibers are actually embedded within two thermoplastic matrices. The first thermoplastic matrix employed for the long fibers may be the same or different than the second thermoplastic matrix. Alternatively, the first thermoplastic plastic matrix used to pre-impregnate the long fibers may constitute the only thermoplastic matrix present in the prepreg. In still another embodiment, the long fibers are not pre-impregnated and are simply combined with the continuous fibers as they both are impregnated with the thermoplastic matrix.

IV. Prepreg Formation

As stated above, the prepreg is generally formed in a manner that is capable of randomly distributing the long fibers. This may be accomplished in a variety of ways. In one particular embodiment, for example, long fiber thermoplastic pellets may be supplied to the hopper of an extrusion device and thereafter melt blended with continuous fibers. The pressure and force of the extrusion process cause the desired random orientation of the long fibers within the resulting prepreg. Referring to FIG. 1, for example, one embodiment of such an extrusion device is shown. More particularly, the apparatus includes an extruder 120 containing a screw shaft 124 mounted inside a barrel 122. A heater 130 (e.g., electrical resistance heater) is mounted outside the barrel 122. During use, a thermoplastic polymer feedstock 127 is supplied to the extruder 120 through a hopper 126. In this particular embodiment, the feedstock 127 also contains long fibers. The long fibers may, for example, constitute from about 5 wt. % to about 60 wt. %, in some embodiments from about 10 wt. % to about 50 wt. %, and in some embodiments, from about 20 wt. % to about 40 wt. % of the feedstock. Alternatively, the feedstock 127 may be free of long fibers, and such fibers may be supplied at another location (not shown), such as downstream from the hopper 126 and/or other feed ports.

Regardless, the thermoplastic feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150. A continuous fiber roving 142 or a plurality of continuous fiber rovings 142 are supplied from a reel or reels 144 to die 150. The rovings 142 are generally kept apart a certain distance before impregnation, such as at least about 4 millimeters, and in some embodiments, at least about 5 millimeters. The feedstock 127 may further be heated inside the die by heaters 133 mounted in or around the die 150. The die is generally operated at temperatures that are sufficient to cause melting and impregnation of the thermoplastic polymer. Typically, the operation temperatures of the die is higher than the melt temperature of the thermoplastic polymer, such as at temperatures from about 200° C. to about 450° C. When processed in this manner, the continuous fiber rovings 142 become embedded in the polymer matrix, which may be a resin 214 (FIG. 2A) processed from the feedstock 127, and intermixed with the long fibers contained therein. The mixture is then extruded from the impregnation die 150 to create an extrudate 152.

A pressure sensor 137 (FIG. 2A) senses the pressure near the impregnation die 150 to allow control to be exerted over the rate of extrusion by controlling the rotational speed of the screw shaft 124, or the federate of the feeder. That is, the pressure sensor 137 is positioned near the impregnation die 150 so that the extruder 120 can be operated to deliver a correct amount of resin 214 for interaction with the fiber rovings 142. After leaving the impregnation die 150, the extrudate 152, or impregnated fiber rovings 142, may enter an optional pre-shaping, or guiding section (not shown) before entering a nip formed between two adjacent rollers 190. Although optional, the rollers 190 can help to consolidate the extrudate 152 into the form of a ribbon (or tape), as well as enhance fiber impregnation and squeeze out any excess voids. In addition to the rollers 190, other shaping devices may also be employed, such as a die system. The resulting consolidated ribbon 156 is pulled by tracks 162 and 164 mounted on rollers. The tracks 162 and 164 also pull the extrudate 152 from the impregnation die 150 and through the rollers 190. If desired, the consolidated ribbon 156 may be wound up at a section 171. Generally speaking, the ribbons are relatively thin and typically have a thickness of from about 0.05 to about 1 millimeter, in some embodiments from about 0.1 to about 0.8 millimeters, and in some embodiments, from about 0.2 to about 0.4 millimeters.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from ribbons of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, rod, etc. The contact surfaces 252 are also typically made of a metal material.

Figure 2A:
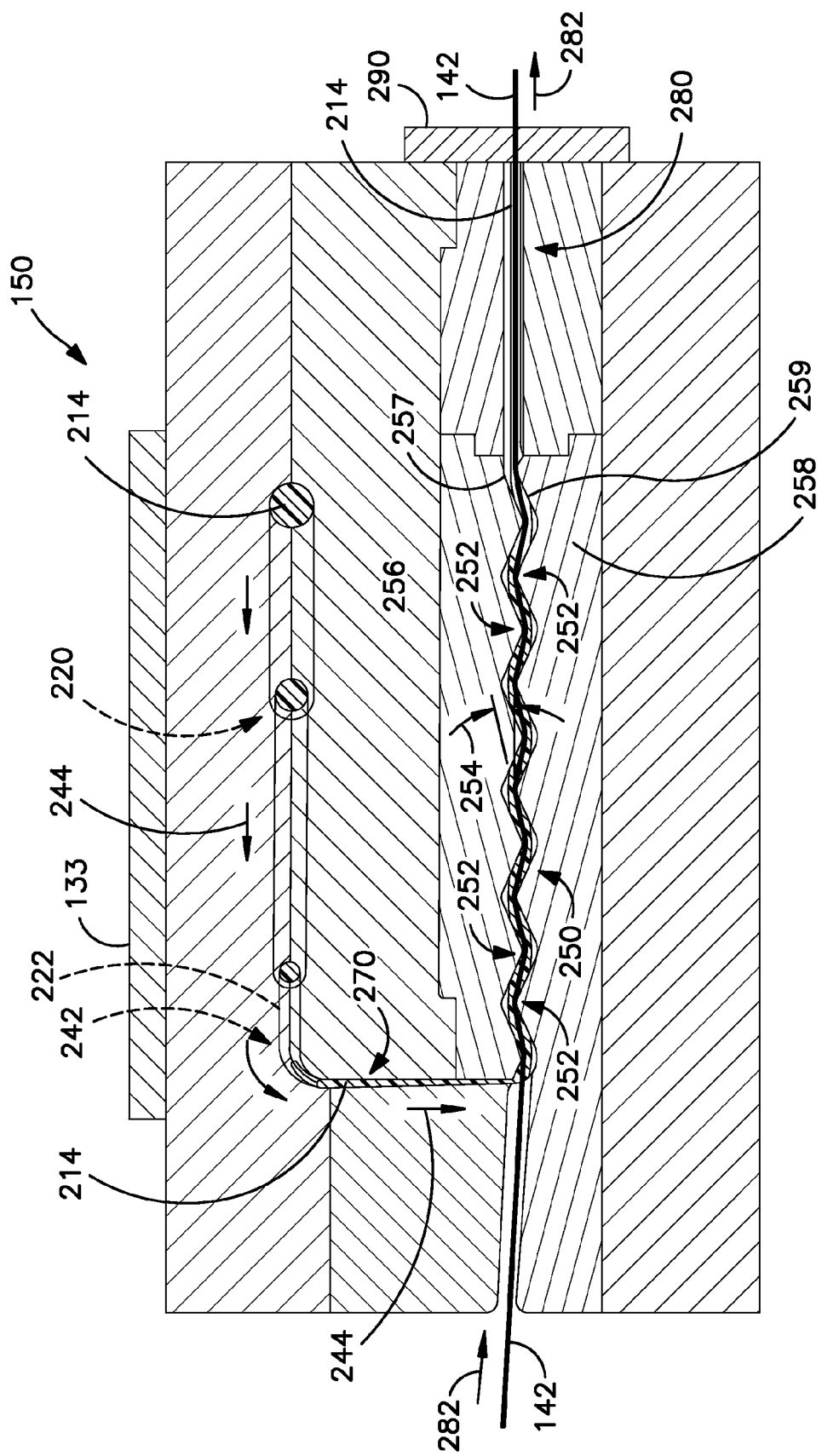
FIG. 2A is a cross-sectional view of the impregnation die shown in FIG. 1.

FIG. 2A shows a cross-sectional view of an impregnation die 150. As shown, the impregnation die 150 includes a manifold assembly 220, a gate passage 270, and an impregnation zone 250. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

Figure 2B:
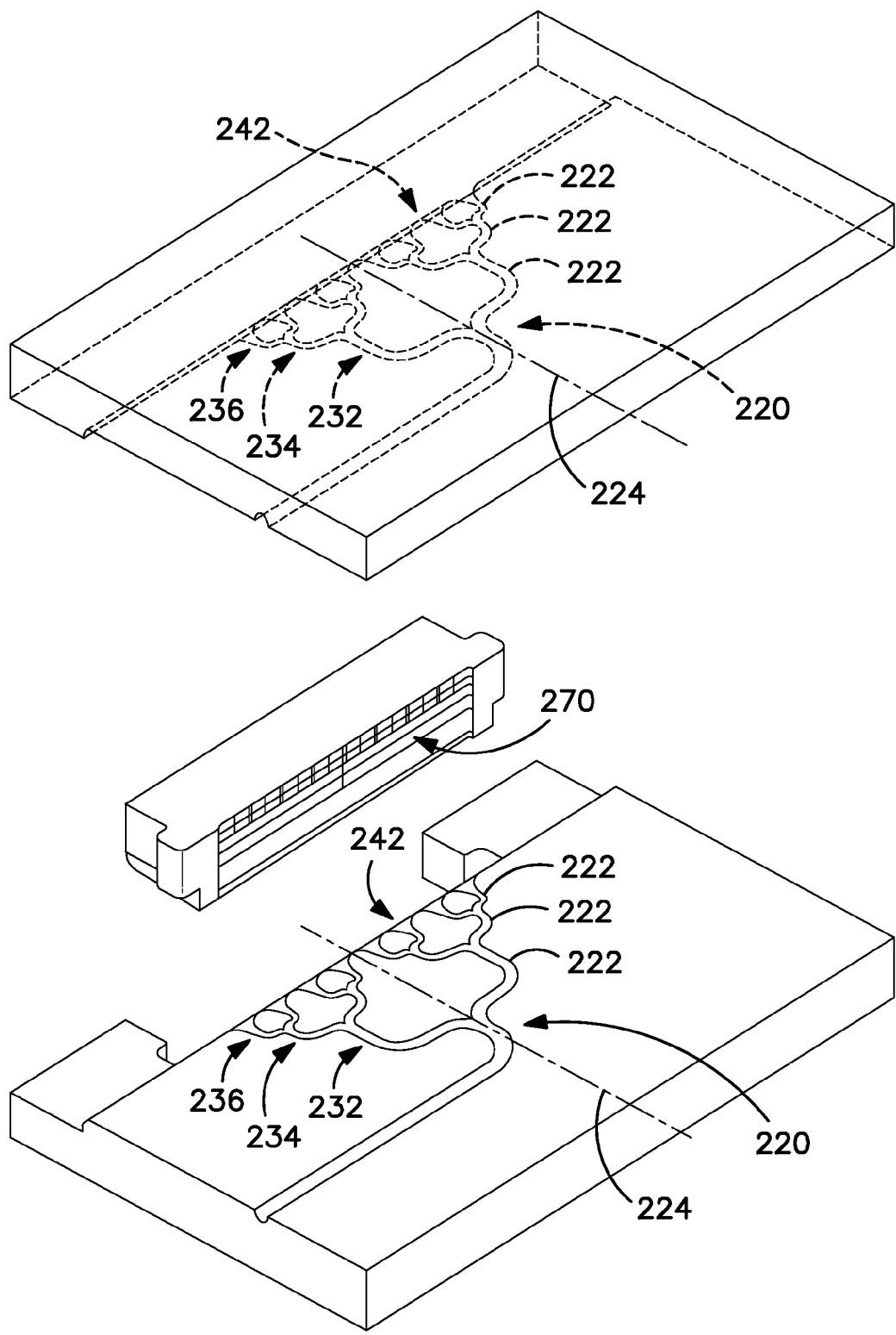
FIG. 2B is an exploded view of one embodiment of a manifold assembly and gate passage for an impregnation die that may be employed in the present invention.

As shown in FIG. 2B, some portions of the channels 222 may be curvilinear, and in exemplary embodiments, the channels 222 have a symmetrical orientation along a central axis 224. Further, in some embodiments, the channels may be a plurality of branched runners 222, which may include first branched runner group 232, second group 234, third group 236, and, if desired, more branched runner groups. Each group may include 2, 3, 4 or more runners 222 branching off from runners 222 in the preceding group, or from an initial channel 222.

The branched runners 222 and the symmetrical orientation thereof generally evenly distribute the resin 214, such that the flow of resin 214 exiting the manifold assembly 220 and coating the rovings 142 is substantially uniformly distributed on the rovings 142. This desirably allows for generally uniform impregnation of the rovings 142.

Further, the manifold assembly 220 may in some embodiments define an outlet region 242, which generally encompasses at least a downstream portion of the channels or runners 222 from which the resin 214 exits. In some embodiments, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142.

As further illustrated in FIGS. 2A and 2B, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough, as shown.

Upon exiting the manifold assembly 220 and the gate passage 270 of the die 150 as shown in FIG. 2A, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214.

Figure 2C:
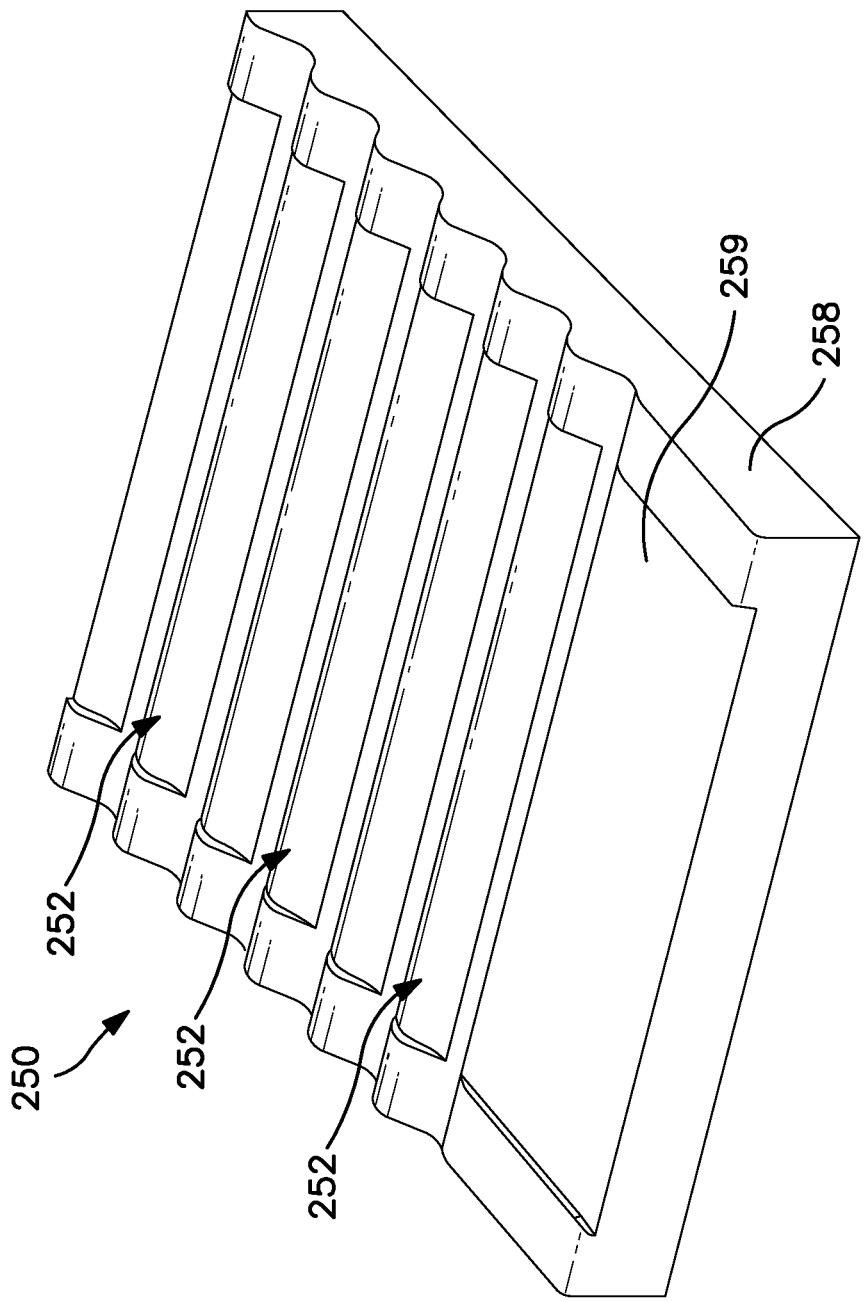
FIG. 2C is a perspective view of one embodiment of a plate at least partially defining an impregnation zone that may be employed in the present invention.

As shown in FIG. 2A, the coated rovings 142 are traversed in run direction 282 through impregnation zone 250, which is configured to impregnate the rovings 142 with the resin 214. For example, as shown in FIGS. 2A and 2C, the rovings 142 are traversed over contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIG. 2A, the impregnation zone 250 is defined between two spaced apart opposing plates 256 and 258. First plate 256 defines a first inner surface 257, while second plate 258 defines a second inner surface 259. The contact surfaces 252 may be defined on or extend from both the first and second inner surfaces 257 and 259, or only one of the first and second inner surfaces 257 and 259. FIG. 2C illustrates the second plate 258 and the various contact surfaces thereon that form at least a portion of the impregnation zone 250 according to these embodiments. In exemplary embodiments, as shown in FIG. 2A, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

The angle 254 at which the rovings 142 traverse the contact surfaces 252 may be generally high enough to enhance shear, but not so high to cause excessive forces that will break the fibers. Thus, for example, the angle 254 may be in the range between approximately 1° and approximately 30°, and in some embodiments, between approximately 5° and approximately 25°.

In alternative embodiments, the impregnation zone 250 may include a plurality of pins (not shown), each pin having a contact surface 252. The pins may be static, freely rotational, or rotationally driven. In further alternative embodiments, the contact surfaces 252 and impregnation zone 250 may comprise any suitable shapes and/or structures for impregnating the rovings 142 with the resin 214 as desired or required.

To further facilitate impregnation of the rovings 142, they may also be kept under tension while present within the impregnation die. The tension may, for example, range from about 5 to about 300 Newtons, in some embodiments from about 50 to about 250 Newtons, and in some embodiments, from about 100 to about 200 Newtons per roving 142 or tow of fibers.

As shown in FIG. 2A, in some embodiments, a land zone 280 may be positioned downstream of the impregnation zone 250 in run direction 282 of the rovings 142. The rovings 142 may traverse through the land zone 280 before exiting the die 150. As further shown in FIG. 2A, in some embodiments, a faceplate 290 may adjoin the impregnation zone 250. Faceplate 290 is generally configured to meter excess resin 214 from the rovings 142. Thus, apertures in the faceplate 290, through which the rovings 142 traverse, may be sized such that when the rovings 142 are traversed therethrough, the size of the apertures causes excess resin 214 to be removed from the rovings 142.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

Figure 3:
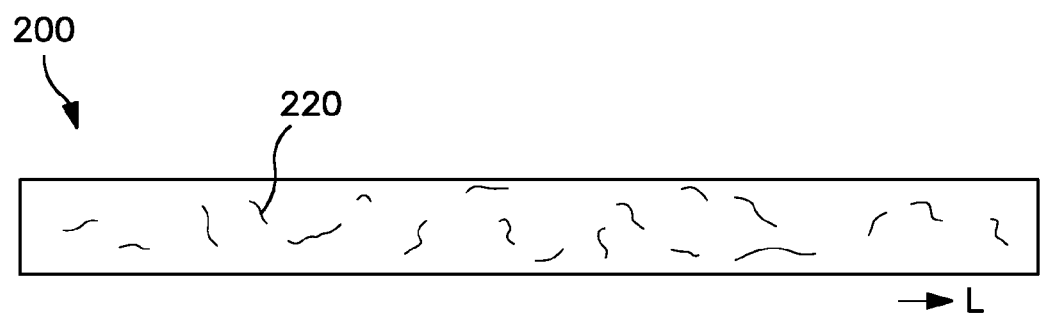
FIG. 3 is a transverse cross-sectional view of one embodiment of a prepreg made with the system of FIG. 1.
Figure 4:
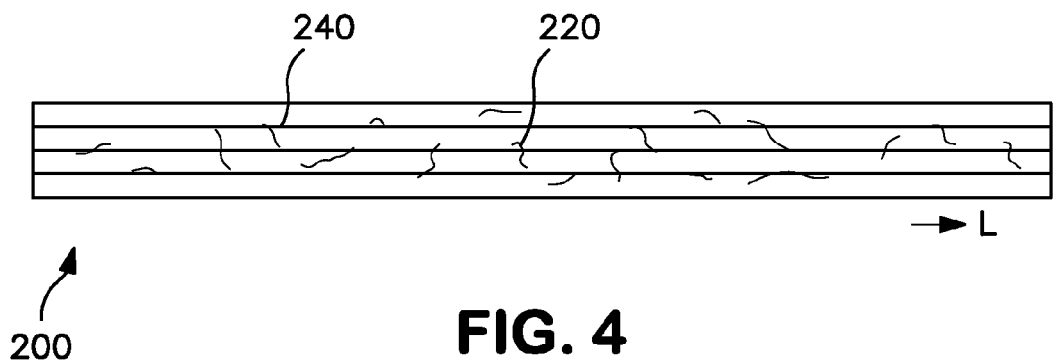
FIG. 4 is a longitudinal cross-sectional view of the prepreg of shown in FIG. 3.

Regardless of the technique employed, at least a portion of the long fibers in the prepreg are oriented at an angle relative to the longitudinal direction in which the continuous fibers are oriented (the machine direction "A" of the system of FIG. 1). For example, about 10% or more, in some embodiments about 20% or more, and in some embodiments, about 30% or more of the fibers may be oriented at an angle relative to the longitudinal direction of the continuous fibers. This angle may, for instance, be about 10° to about 120°, in some embodiments from about 20° to about 110° C., and in one embodiment, about 90°. Referring to FIGS. 3-4, for example, one embodiment of a prepreg 200 is shown that contains a plurality of long fibers 220 oriented at various angles relative to a longitudinal direction "L" in which continuous fibers 240 are aligned. Among other things, the angle of orientation helps control the transverse strength of the prepreg.

In addition, the relative percentage of long fibers and continuous fibers in the prepreg also help to control the strength properties. To achieve a good balance between tensile strength and transverse strength, the ratio of the weight of continuous fibers to the weight of long fibers is typically controlled within the range of from about 0.2 to about 10, in some embodiments from about 0.4 to about 5, and in some embodiments, from about 0.5 to about 5. For instance, continuous fibers may constitute from about 10 wt. % to about 80 wt. %, in some embodiments from about 20 wt. % to about 70 wt. %, and in some embodiments, from about 40 wt. % to about 60 wt. % of the prepreg. Likewise, long fibers may constitute from about 2 wt. % to about 35 wt. %, in some embodiments from about 5 wt. % to about 30 wt. %, and in some embodiments, from about 10 wt. % to about 25 wt. % of the prepreg. Thermoplastic polymer(s) may constitute from about 10 wt. % to about 80 wt. %, in some embodiments from about 20 wt. % to about 70 wt. %, and in some embodiments, from about 40 wt. % to about 60 wt. % of the prepreg.

The prepreg also has a very low void fraction, which helps enhance the mechanical properties of the prepreg. For instance, the void fraction may be about 3% or less, in some embodiments about 2% or less, and in some embodiments, about 1% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the thermoplastic matrix, which may then be used to calculate the "void fraction" based on the following equations:

$$V_f = 100*(\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the thermoplastic matrix (e.g., at the appropriate crystallinity);

$\rho_f$ is the density of the fibers;

$W_f$ is the weight fraction of the fibers; and $W_m$ is the weight fraction of the thermoplastic matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the thermoplastic polymer, fibers, and ribbon in accordance with ASTM D 2734-09 (Method A), where the densities may be determined ASTM D792-08 Method A. Of course, the void fraction can also be estimated using conventional microscopy equipment.

Through control over the various parameters mentioned above, the mechanical strength properties may be tailored to the desired application. In certain embodiments, for example, it is desirable that the prepreg exhibits relatively isotropic strength properties. More particularly, for such isotropic prepregs, the ratio of the maximum tensile stress (or "ultimate strength") in the longitudinal direction to the maximum tensile stress in the transverse direction is typically from about 1 to about 40, in some embodiments from about 2 to about 30, and in some embodiments, from about 4 to about 20. In certain embodiments, the prepreg of the present invention may exhibit a maximum tensile stress in the longitudinal direction of from about 250 to about 3000 Megapascals (MPa), in some embodiments from about 400 to about 2500 MPa, and in some embodiments, from about 600 to about 2000 MPa, and in the transverse direction of from about 0.5 to about 50 MPa, in some embodiments from about 1 to about 40 MPa, and in some embodiments, from about 2 to about 20 MPa.

Figure 6:
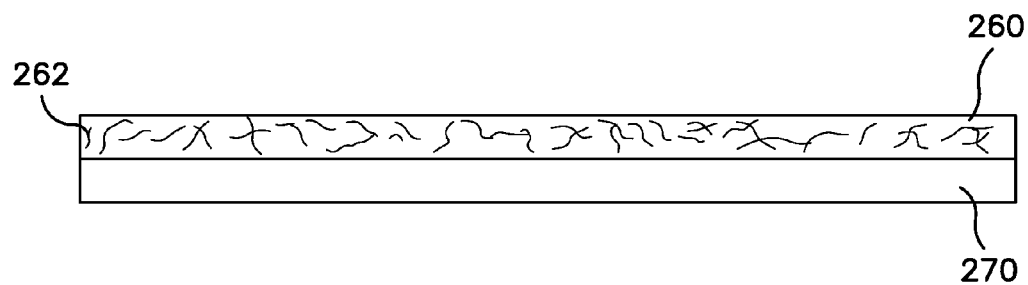
FIG. 6 is a transverse cross-sectional view of anode embodiment of a prepreg made of the present invention.
Figure 7:
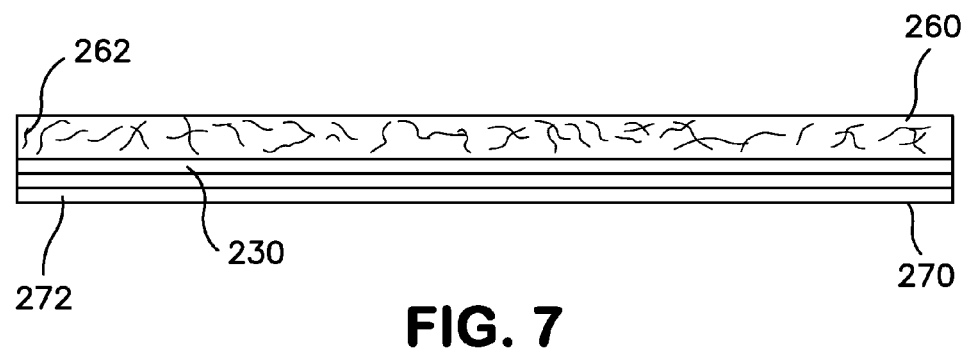
FIG. 7 is a longitudinal cross-sectional view of the prepreg of shown in FIG. 6.

In the embodiments described above and shown in FIGS. 3-4, the long fibers are incorporated into the extrusion device during impregnation and therefore become intermingled with the continuous fibers and generally distributed throughout the entire prepreg. It should be understood, however, that such a configuration is not required. In certain embodiments, for example, the long fibers may be combined with the continuous fibers in such a manner that they form separate layers. The layers may be "non-discrete" in the sense that at least a portion of the long fibers extend into the continuous fiber layer. One embodiment of a system for forming such a non-discrete layered prepreg may include an additional device (e.g., extruder) that is employed to apply the long fibers downstream from the die for impregnating the continuous fibers. Long fibers applied in this manner are still randomly distributed within the prepreg, but form a separate layer. This is illustrated in more detail in FIGS. 6-7. As shown, a layer 260 is formed that contains the long fibers 262 and a layer 270 is formed that contains continuous fibers 272. Due in part to the manner in which they are applied, a portion 230 of the long fibers 262 may also extend into the continuous fibers layer 270.

Figure 8:
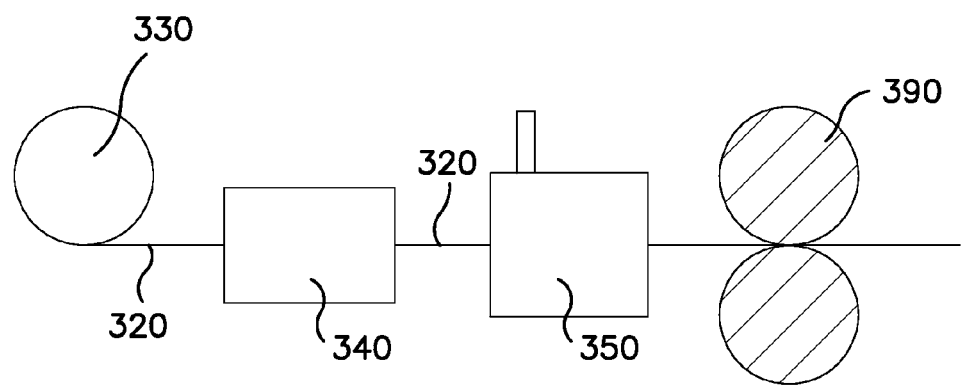
FIG. 8 is a schematic illustration of yet another embodiment of an impregnation system for use in forming the prepreg the present invention.
Figure 9:
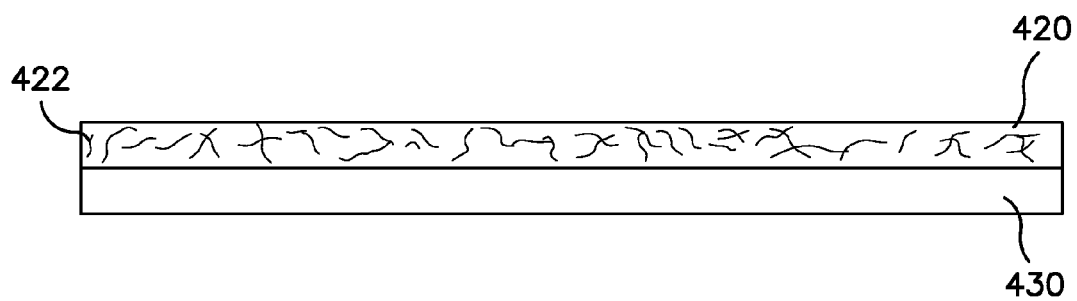
FIG. 9 is a transverse cross-sectional view of one embodiment of a prepreg made with the system of FIG. 8.
Figure 10:
FIG. 10 is a longitudinal cross-sectional view of the prepreg of shown in FIG. 9.

Of course, the layers may also be "discrete" in the sense that substantially all of the long fibers are contained within the layer. One embodiment of a system for forming such a discrete layered prepreg is shown in FIG. 8. In this particular embodiment, a pre-consolidated continuous fiber prepreg 320 is unwound from a reel 330 and heated to or above the softening point of the thermoplastic matrix within an oven 340 (e.g., infrared oven). Thereafter, the softened prepreg 320 is supplied to an extrusion device 350 where long fibers (not shown) may be applied. The resulting layered prepreg 360 may then be supplied between two consolidation rolls 290 as described above. Once again, the long fibers applied in this manner are still randomly distributed within the prepreg, but form a separate "discrete" layer. This is illustrated in more detail in FIGS. 9-10. As shown, a layer 420 is formed that contains long fibers 422 and a layer 430 is formed that contains the continuous fibers 424.

V. Articles Formed from the Prepreg

The prepreg of the present invention may generally be employed in a variety of different applications and parts. For example, the prepreg may be formed into a profile, injection molded part, compression molded, part, etc. A "profile" is hollow or solid pultruded part that may possess a wide variety of cross-sectional shapes, such as square, rectangular, circular, elliptical, triangular, I-shaped, C-shaped, U-shaped, J-shaped, L-shaped, slotted, etc. In hollow profiles, at least a portion of the interior of the profile is a voided space. The voided space may optionally extend the entire the length of the profile. The profiles may also be "lineal" to the extent that they possess a cross-sectional shape that is substantially the same along the entire length of the profile, or they may have a varying cross-sectional shape, such as curved, twisted, etc. Regardless, such profiles may be employed as a structural member for window lineals, decking planks, railings, balusters, roofing tiles, siding, trim boards, pipe, fencing, posts, light posts, highway signage, roadside marker posts, etc.

Figure 5:
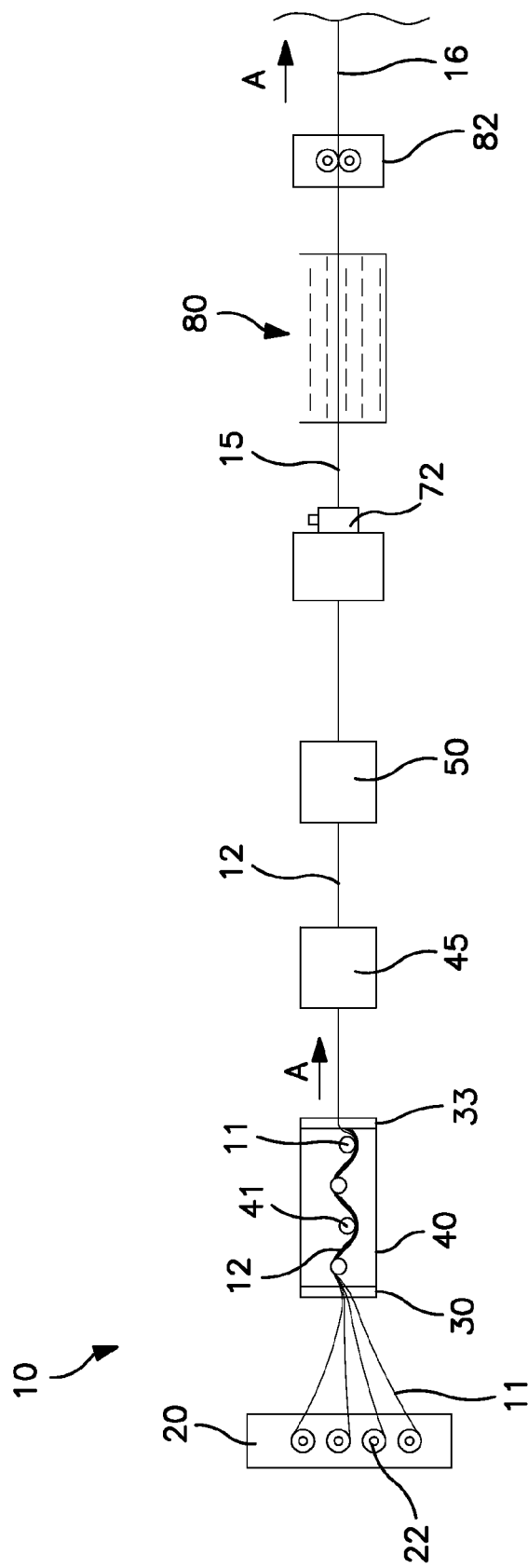
FIG. 5 is a schematic illustration of one embodiment of a pultrusion system that may be employed in forming a profile from the prepreg of the present invention.

The manner in which a profile may be formed from a prepreg can vary as is well known to those skilled in the art. One or multiple prepreg layers may be employed for forming the profile. Referring to FIG. 5, for example, one particular embodiment of a system is shown in which a plurality of prepregs 12 are employed to form a profile. In this embodiment, the prepregs 12 are provided in a wound package on a creel 20. The creel 20 may be an unreeling creel that includes a frame provided with horizontal rotating spindles 22, each supporting a package. A pay-out creel may also be employed, particularly if desired to induce a twist into the fibers. It should also be understood that the prepregs may also be formed in-line with the formation of the profile. In one embodiment, for example, the extrudate 152 exiting the impregnation die 150 from FIG. 1 may be directly supplied to the system used to form a profile.

A tension-regulating device 40 may also be employed to help control the degree of tension. The device 40 may include inlet plate 30 that lies in a vertical plane parallel to the rotating spindles 22 of the creel 20. The tension-regulating device 40 may contain cylindrical bars 41 arranged in a staggered configuration so that the prepregs 12 pass over and under these bars to define a wave pattern. The height of the bars can be adjusted to modify the amplitude of the wave pattern and control tension.

If desired, the prepregs 12 may be heated in an oven 45 having any of a variety of known configuration, such as an infrared oven, convection oven, etc. During heating, the fibers are unidirectionally oriented to optimize the exposure to the heat and maintain even heat across the entire profile. The temperature to which the ribbons 12 are heated is generally high enough to soften the thermoplastic polymer to an extent that the ribbons can bond together. However, the temperature is not so high as to destroy the integrity of the material. The temperature may, for example, range from about 100° C. to about 300° C., in some embodiments from about 110° C. to about 275° C., and in some embodiments, from about 120° C. to about 250° C. In one particular embodiment, for example, acrylonitrile-butadiene-styrene (ABS) is used as the polymer, and the ribbons are heated to or above the melting point of ABS, which is about 105° C. In another embodiment, polybutylene terephalate (PBT) is used as the polymer, and the ribbons are heated to or above the melting point of PBT, which is about 224° C.

Upon being heated, the continuous fiber ribbons 12 may be provided to a consolidation die to help bond together different ribbon layers, as well as for alignment and formation of the initial shape of the profile. Although referred to herein as a single die, it should be understood that the consolidation die 50 may in fact be formed from multiple individual dies (e.g., face plate dies). The consolidation die 50 may receive the prepregs 12 so that it is guided through a channel (not shown) of the die 50 in a direction "A". The channel may be provided in any of a variety of orientations and arrangements to result in the desired reinforcement scheme. Within the die 50, the prepregs are generally maintained at a temperature at or above the melting point of the thermoplastic matrix used in the ribbon to ensure adequate consolidation.

If desired, a pultrusion die 60 may also be employed that compresses the prepregs into the final shape for the profile. The configuration of the die 60 depends on the desired shape and properties for the resulting profile. To form hollow profiles, the pultrusion die typically contains a mandrel within its interior so that the fiber material flows between the interior surface of the die and the external surface of the mandrel to form the desired shape. Further, although referred to herein as a single die, it should be understood that the pultrusion die 60 may be formed from multiple individual dies.

One or multiple layers may be employed for forming the profile. In one embodiment, for example, multiple layers are employed and initially spaced apart from each other in the vertical direction. As they pass through respective channels of the consolidation die 50, the widths of the layers are optionally ribboned to help prevent pressure wedges, and to keep the continuous fibers aligned and twist-free. Although not specifically shown, a mandrel may also be provided in the interior of the consolidation die 50 to help guide the layers into contact with each other on at least one side of the profile. For example, one side of a prepreg layer and a side of another prepreg layer may be angled so that they contact each other and form a side of a hollow profile. The other side of the profile is, however, typically left open within the consolidation die 50 so that the long fiber material can be subsequently applied to the interior of the profile in the pultrusion die. When in the desired position, the prepreg layers are pulled into a pultrusion die 60 as described above.

If desired, the resulting profile may also be applied with a capping layer to enhance the aesthetic appeal of the profile and/or protect it from environmental conditions. Referring to FIG. 5, for example, such a capping layer may be applied via an extruder oriented at any desired angle to introduce a thermoplastic resin into a capping die 72. The resin may contain any suitable thermoplastic polymer known in the art that is generally compatible with the thermoplastic polymer used to form the profile. Suitable capping polymers may include, for instance, acrylic polymers, polyvinyl chloride (PVC), polybutylene terephthalate (PBT), ABS, polyolefins, polyesters, polyacetals, polyamids, polyurethanes, etc. Although the capping resin is generally free of fibers, it may nevertheless contain other additives for improving the final properties of the profile. Additive materials employed at this stage may include those that are not suitable for incorporating into the continuous fiber or long fiber layers. For instance, it may be desirable to add pigments to the composite structure to reduce finishing labor of shaped articles, or it may be desirable to add flame retardant agents to the composite structure to enhance the flame retarding features of the shaped article. Because many additive materials are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die 72 may include various features known in the art to help achieve the desired application of the capping layer. For instance, the capping die 72 may include an entrance guide that aligns the incoming profile. The capping die may also include a heating mechanism (e.g., heated plate) that pre-heats the profile before application of the capping layer to help ensure adequate bonding.

Following optional capping, the shaped part 15 may be supplied to a cooling system 80 as is known in the art. The cooling system 80 may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Following optional capping, the shaped part is then finally cooled using a cooling system 80 as is known in the art. The cooling system 80 may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Vacuum sizers are typically employed when forming the profile. Even if a vacuum sizer is not employed, however, it is generally desired to cool the profile after it exits the capping die (or the consolidation or calibration die if capping is not applied). Cooling may occur using any technique known in the art, such a vacuum water tank, cool air stream or air jet, cooling jacket, an internal cooling channel, cooling fluid circulation channels, etc. Regardless, the temperature at which the material is cooled is usually controlled to achieve optimal mechanical properties, part dimensional tolerances, good processing, and an aesthetically pleasing composite. For instance, if the temperature of the cooling station is too high, the material might swell in the tool and interrupt the process. For semi-crystalline materials, too low of a temperature can likewise cause the material to cool down too rapidly and not allow complete crystallization, thereby jeopardizing the mechanical and chemical resistance properties of the composite. Multiple cooling die sections with independent temperature control can be utilized to impart the optimal balance of processing and performance attributes. In one particular embodiment, for example, a vacuum water tank is employed that is kept at a temperature of from about 10° C. to about 50° C., and in some embodiments, from about 15° C. to about 35° C.

As will be appreciated, the temperature of the profile as it advances through any section of the system of the present invention may be controlled to yield optimal manufacturing and desired final composite properties. Any or all of the assembly sections may be temperature controlled utilizing electrical cartridge heaters, circulated fluid cooling, etc., or any other temperature controlling device known to those skilled in the art.

Referring again to FIG. 5, a pulling device 82 is positioned downstream from the cooling system 80 that pulls the finished profile 16 through the system for final sizing of the composite. The pulling device 82 may be any device capable of pulling the profile through the process system at a desired rate. Typical pulling devices include, for example, caterpillar pullers and reciprocating pullers. If desired, one or more calibration dies (not shown) may also be employed. Such dies contain openings that are cut to the exact profile shape, graduated from oversized at first to the final profile shape. As the profile passes therethrough, any tendency for it to move or sag is counteracted, and it is pushed back (repeatedly) to its correct shape. Once sized, the profile may be cut to the desired length at a cutting station (not shown), such as with a cut-off saw capable of performing cross-sectional cuts.

Figure 11:
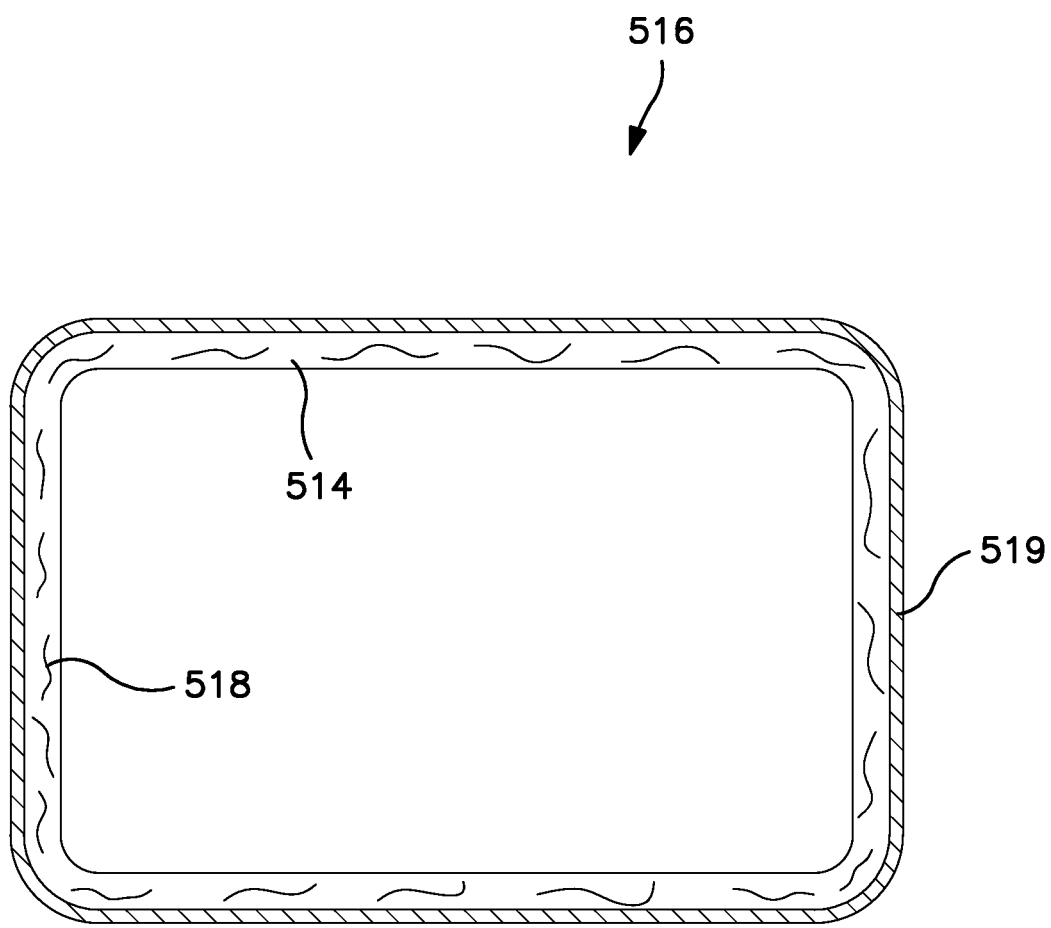
FIG. 11 is a cross-sectional view of one embodiment of a profile that may be formed in accordance with the present invention.

One embodiment of the profile formed from the method described above is shown in more detail in FIG. 11 as element 516. As illustrated, the profile 516 has a generally rectangular shape and is formed from a ribbon 514 within which is distributed a plurality of long fibers 518. The ribbon 514 may be formed from one or more prepregs of the present invention. A capping layer 519 also extends around the perimeter of the ribbon 514 and defines an external surface of the profile 516. The thickness of the ribbon may be strategically selected to help achieve a particular tensile strength and transverse strength (e.g., flexural modulus) for the profile. For example, the ribbon may have a thickness of from about 1.0 to about 4.0 millimeters, and in some embodiments, from about 2.0 to about 3.0 millimeters. The thickness of the capping layer 519 depends on the intended function of the part, but is typically from about 0.1 to about 5 millimeters, and in some embodiments, from about 0.2 to about 3 millimeters.

As will be appreciated, the particular profile embodiment described above is merely exemplary of the numerous designs that are made possible by the present invention. Among the various possible profile designs, it should be understood that additional layers of continuous and/or long fiber material may be employed in addition to those described above.

In addition to pultrusion, other systems may also be employed to process the prepregs into the desired article. For example, an injection molding system may be employed that includes a mold within which one or more prepregs may be disposed. The time inside the injector may be controlled and optimized so that thermoplastic resin is not pre-solidified. When the cycle time is reached and the barrel is full for discharge, a piston may be used to inject the material to the mold cavity. Compression molding systems may also be employed in the present invention. As with injection molding, the shaping of the prepreg(s) into the desired article also occurs within a mold. The prepreg(s) may be placed into the compression mold using any known technique, such as by being picked up by an automated robot arm. The temperature of the mold may be maintained at or above the solidification temperature of the thermoplastic resin for a desired time period to allow for solidification. The molded product may then be solidified by bringing it to a temperature below that of the melting temperature. The resulting product may be demolded. The cycle time for each molding process may be adjusted to suit the resins used, to achieve sufficient bonding, and to enhance overall process productivity.

The mold used in the systems described above may be a single cavity or multi-cavity mold. The number of the cavities may be determined by the resin used, the cycle time, and the output rate desired. The shape of the mold may be selected to produce products for specific applications, such as siding panels, fence picket parts, end caps, joints, hinges, trim boards for interior and exterior decoration, synthetic roofing shingles, slates, shakes or panels, etc.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A thermoplastic prepreg comprising:
    a plurality of continuous fibers that are substantially oriented in a longitudinal direction, the continuous fibers constituting from about 10 wt. % to about 80 wt. % of the prepreg;
    a plurality of randomly distributed long fibers, at least a portion of which are oriented at an angle relative to the longitudinal direction, the long fibers constituting from about 2 wt. % to about 35 wt. % of the prepreg; and
    a resinous matrix that contains one or more thermoplastic polymers and within which the continuous fibers and long fibers are embedded, wherein the thermoplastic polymers constitute from about 10 wt. % to about 80 wt. % of the prepreg;
    wherein the ratio of the maximum tensile stress of the prepreg in the longitudinal direction to the maximum tensile stress of the prepreg in the transverse direction is from about 1 to about 40; and
    wherein the long fibers are present within the first layer of the prepreg, the continous fibers are present within a second layer of the prepreg, and at least a portion of the long fibers extend into the second layer.

2. The thermoplastic prepreg of claim 1, wherein the ratio of the maximum tensile stress of the prepreg in the longitudinal direction to the maximum tensile stress of the prepreg in the transverse direction is from about 2 to about 30.

3. The thermoplastic prepreg of claim 1, wherein the prepreg exhibits a maximum tensile stress of from about 250 to about 3000 Megapascals in the longitudinal direction.

4. The thermoplastic prepreg of claim 1, wherein the prepreg exhibits a maximum tensile stress of from about 0.5 to about 50 Megapascals in the transverse direction.

5. The thermoplastic prepreg of claim 1, wherein the continuous fibers constitute from about 20 to about 70 wt. % of the prepreg.

6. The thermoplastic prepreg of claim 1, wherein the long fibers constitute from about 5 to about 30 wt. % of the prepreg.

7. The thermoplastic prepreg of claim 1, wherein the continuous fibers, the long fibers, or both, include glass fibers, carbon fibers, or a combination of glass and carbon fibers.

8. The thermoplastic prepreg of claim 1, wherein the thermoplastic polymers include a polyolefin, polyether ketone, polyetherimide, polyarylene ketone, liquid crystal polymer, polyarylene sulfide, fluoropolymer, polyacetal, polyurethane, polycarbonate, styrenic polymer, polyester, polyimide, or a combination thereof.

9. The thermoplastic prepreg of claim 1, wherein the prepreg has a void fraction of about 2% or less.

10. A lineal profile comprising the prepreg of claim 1.

11. The lineal profile of claim 10, wherein the profile further comprises a capping layer that defines a surface of the profile.

12. A molded part that comprises the prepreg of claim 1.

13. A thermoplastic prepreg comprising:
    a plurality of continuous fibers that are substantially oriented in a longitudinal direction, the continuous fibers constituting from about 10 wt. % to about 80 wt. % of the prepreg;
    a plurality of randomly distributed long fibers, at least a portion of which are oriented at an angle relative to the longitudinal direction, the long fibers constituting from about 2 wt. % to about 35 wt. % of the prepreg; and a resinous matrix that contains one or more thermoplastic polymers and within which the continuous fibers and long fibers are embedded, wherein the thermoplastic polymers constitute from about 10 wt. % to about 80 wt. % of the prepreg;

wherein the ratio of the maximum tensile stress of the prepreg in the longitudinal direction to the maximum tensile stress of the prepreg in the transverse direction is from about 1 to about 40; and wherein the long fibers are intermingled with the continuous fibers.

14. The thermoplastic prepreg of claim 13, wherein the ratio of the maximum tensile stress of the prepreg in the longitudinal direction to the maximum tensile stress of the prepreg in the transverse direction is from about 2 to about 30.

15. The thermoplastic prepreg of claim 13, wherein the prepreg exhibits a maximum tensile stress of from about 250 to about 3000 Megapascals in the longitudinal direction.

16. The thermoplastic prepreg of claim 13, wherein the prepreg exhibits a maximum tensile stress of from about 0.5 to about 50 Megapascals in the transverse direction.

17. The thermoplastic prepreg of claim 13, wherein the continuous fibers constitute from about 20 to about 70 wt. % of the prepreg.

18. The thermoplastic prepreg of claim 13, wherein the long fibers constitute from about 5 to about 30 wt. % of the prepreg.

19. The thermoplastic prepreg of claim 13, wherein the continuous fibers, the long fibers, or both, include glass fibers, carbon fibers, or a combination of glass and carbon fibers.

20. The thermoplastic prepreg of claim 13, wherein the thermoplastic polymers include a polyolefin, polyether ketone, polyetherimide, polyarylene ketone, liquid crystal polymer, polyarylene sulfide, fluoropolymer, polyacetal, polyurethane, polycarbonate, styrenic polymer, polyester, polyimide, or a combination thereof.

21. The thermoplastic prepreg of claim 13, wherein the prepreg has a void fraction of about 2% or less.

* * * * *